Sept. 6, 1955 R. MADEY 2,717,316
PULSE LIMITER AND SHAPER
Filed Dec. 24, 1952
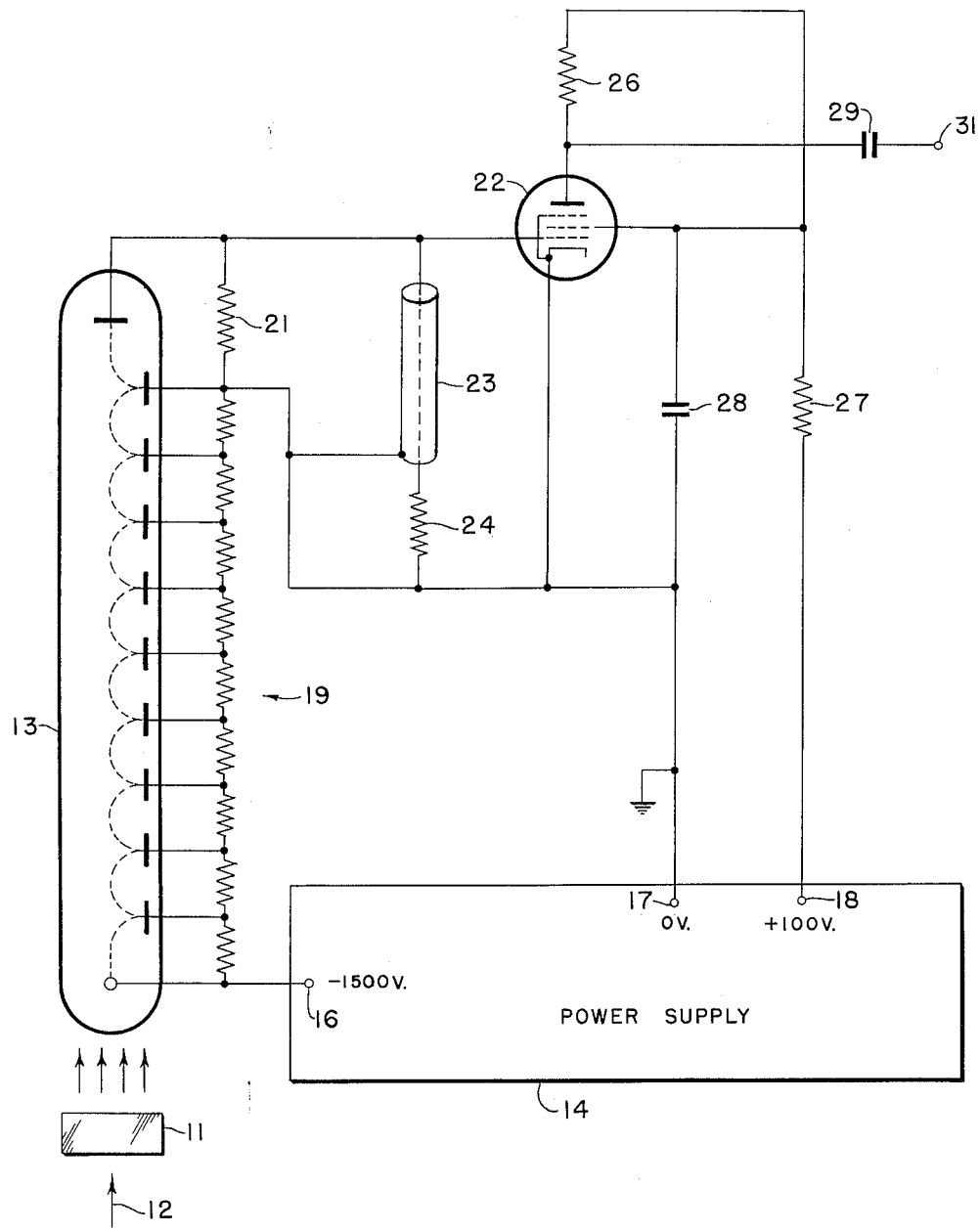
INVENTOR.
RICHARD MADEY
BY
Roland A. Anderson
ATTORNEY

United States Patent Office 2,717,316
Patented Sept. 6, 1955

2,717,316
PULSE LIMITER AND SHAPER

Richard Madey, Berkeley, Calif., assignor to the United States of America as represented by the United States Atomic Energy Commission Application December 24, 1952, Serial No. 327,856

6 Claims. (Cl. 250—207)

The present invention relates to a pulse limiter and shaper and more particularly to a circuit for limiting and shaping the output pulses of a photomultiplier tube.

The techniques and equipment for counting the incidence of nuclear particles have been improved considerably by the use of scintillation indicators, such as stilbene phosphors in combination with photomultiplier tubes, to detect and translate particle energy into electrical energy and by the use of distributed amplifiers and coincidence circuits. In many applications it is necessary to limit the amplitude of electric pulses developed at the output of photomultiplier tubes and, in so doing, the duration of the pulses has been increased, thereby decreasing the efficiency of the counting arrangement. An electronic pulse limiter and shaper circuit to overcome the above-referenced pulse stretching has been described by L. F. Wouters in U. S. Patent 2,576,661 granted November 27, 1951. The teaching of such patent involves the combination of a two stage amplifier followed by a discriminator stage with a positive feedback loop connected from the output of the latter stage to the input of the amplifier.

The present invention is an improvement in known pulse limiter and shaper circuits, such as the above-referenced patent, in that the resolving time or "dead time" of the circuit has been substantially improved and a simpler and less costly device has been provided. By "dead time" is meant that time during which one pulse renders the circuit operative and incapable of receiving a subsequent pulse or differentiating between pulses corresponding to different amounts of energy given up in the scintillation indicator. Such advantages have been achieved by reducing the number of tubes required to one and achieving the discharge of circuit distributed and interelectrode capacitances by utilizing a section of coaxial cable suitably connected to the anode of the circuit photomultiplier tube. Such latter connection also serves to render the circuit sensitive to consecutive pulses corresponding to light scintillations of differing magnitude, as where a small scintillation occurs after a large one but within the decay time of the latter.

It is therefore an object of the present invention to provide a new and improved pulse shaper and limiter circuit.

Another object of the invention is to provide a circuit for limiting the output pulses of a photomultiplier tube in duration and amplitude.

Still another object of the invention is to provide a circuit wherein pulse duration is limited by a section of coaxial cable terminated in less than the characteristic impedance thereof and pulse amplitude is limited by a tube having a sharp cut-off characteristic.

A further object of the invention is to provide a circuit for use with scintillation indicators which discriminates between a scintillation of small intensity occurring during the decay time of a scintillation of larger intensity.

A still further object of the invention is to provide a pulse limiter and shaper circuit for use with a photomultiplier tube which is simple and has a low manufacturing cost as well as an improved resolving time.

Other objects and advantages of the invention will be apparent from the following description and claims considered together with the accompanying drawing which is a schematic wiring diagram of the invention.

Referring to the drawing in detail there is provided a scintillation crystal 11 which may be disposed in the path of a beam 12 of nuclear particles. As such particles pass through the crystal 11 a certain amount of the energy of the particles is lost and appears in the form of light scintillations. To transform the light scintillations into electrical energy, a photomultiplier tube 13 is positioned with the light-sensitive cathode thereof adjacent to the crystal 11.

A conventional power supply 14 having a 1500 volt negative terminal 16, a grounded terminal 17, and a 100 volt positive terminal 18 is utilized to supply operating voltages for the circuit elements of the invention. Connected between the negative terminal 16 and the grounded terminal 17, there is a resistance voltage divider 19 having a plurality of taps conventionally connected to the various elements of the photomultiplier tube 13 to render the tube operative.

The anode of the photomultiplier tube 13 is connected to the grounded terminal 17 through a resistor 21 and directly to the control grid of a pentode type amplifier tube 22. Also connected to the control grid of the amplifier tube 22 is one end of the central conductor of a short section of coaxial cable 23. Terminating such coaxial cable 23 there is provided a resistor 24 connected between the other end of the central conductor of the cable and the outer conductor thereof, which latter conductor is also connected to the grounded terminal 17. The values of the two resistors 21 and 24 and the time constant (and therefore length) of the coaxial cable 23 will be discussed in detail hereinafter, as well as a required characteristic of the amplifier tube 22.

Further connections of the amplifier tube 22 are made by connecting the cathode to the suppressor grid and to the grounded terminal 17; by connecting the anode to the positive terminal 18 through two series-connected resistors 26 and 27; and by connecting the screen grid to the junction between the two resistors 26 and 27, which junction is connected to the grounded terminal 17 through a by-pass capacitor 28. A coupling capacitor 29 is connected between the anode of the amplifier tube 22 and an output terminal 31 so that the output voltage of the circuit may be taken from between the output terminal and the grounded terminal 17.

Now with the elements of the invention interconnected in accordance with the foregoing description and with the power supply 14 suitably energized, the operation of the invention will be considered. The incidence of a nuclear particle upon the crystal 11 results in a light scintillation which reaches the light-sensitive cathode of the photomultiplier tube 13 to release electrons therefrom. Such electrons are attracted to the first dynode where secondary electrons are formed to increase the current flow and this action occurs at each successive dynode until a greatly increased pulse occurs at the anode of the photomultiplier tube 13. Because of the pulse at the anode of the photomultiplier tube 13 a negative pulse is developed across the resistor 21 which impresses a negative pulse on the control grid of the amplifier tube 22.

Because of the inherent characteristics of scintillation indicators and interelectrode and distributed capacitances of the circuit elements, the voltage impressed at the control grid of the amplifier tube 22 has a steeply rising wave front, but a substantially long trailing end. It will be readily apparent that the trailing end of a pulse interferes with the operation of the circuit in that a subsequent pulse, corresponding to a scintillation of lesser intensity, may be missed during the time of decay of the former pulse. To correct for such effect a short length of coaxial cable 23 is connected to the control grid of the amplifier tube 22 to reflect a voltage of opposite phase to cancel out the trailing end of the pulse by rapidly discharging the capacitances.

For proper charging of the section of coaxial cable 23 the sending end thereof (i. e., the end connected to the control grid of the amplifier tube 22) should have a resistance substantially equal in value to the characteristic impedance of the cable connected thereacross. Thus the value of the resistor 21 is chosen to be substantially that of the characteristic impedance of the coaxial cable 23. Another consideration is that of the most effective load impedance for the photomultiplier tube 13 and it has been found that for a fixed operating voltage on the tube and for a given energy loss in the crystal 11, the output voltage from the tube usually can be increased by increasing the load impedance. Thus the coaxial cable 23 is chosen to have a high value of characteristic impedance, for example, about 1000 ohms.

The next consideration is that of selecting the proper length of coaxial cable which will reflect a wave in sufficient time to accomplish the desired effect of reducing the duration of the input pulse to maintain a maximum detection rate. The time limit selected for the present embodiment of the invention is about $10^{-8}$ second and to accomplish such limit 1½ inches of type RG65/U delay cable is utilized. It will be apparent that other time limits may be selected and the length of the type of cable established accordingly.

It has been found that the decay time of the pulses appearing at the output of the photomultiplier tube 13 is shorter than the reflection time of the usually selected length of coaxial cable 23. Such finding means that, if the receiving end of the cable 23 were short-circuited, the reflected pulse would be 180 degrees out of phase and have the full amplitude of the original pulse. The result would then be an "overshoot" so that the line would be charged in the opposite sense from the original pulse. To correct the foregoing "overshoot" the coaxial cable 23 may be terminated at the receiving end in an impedance having a value substantially less than the characteristic impedance of the cable so that the amplitude of the reflected wave has a value such as to cancel the voltage at the sending end (in the present embodiment the terminating impedance is selected as a resistor 24). From the foregoing considerations, it is seen that the duration of the input pulses to the amplifier tube 22 is limited to the selected time for the pulse to charge the coaxial cable 23 and be reflected back to the sending end thereof.

In addition to limiting the duration of the pulses developed in response to the incidence of nuclear particles upon the crystal 11, it is also desirable to limit the pulses to a uniform amplitude. The importance of the latter feature becomes apparent when it is considered that further amplification of the pulses is normally necessary and, unless tube saturation is prevented in the following amplifier circuit, the fast resolving time of the circuit will be lost. Amplitude limiting of the pulses is accomplished by selecting a tube having a sharp cut-off characteristic as the amplifier tube 22. To best utilize the sharp cut-off characteristic of the tube 22 it will be seen that the voltages impressed on the control grid should be as large as possible. In such respect, in the present circuit, the value of the grid resistor 21 is limited by the value of the characteristic impedance of the coaxial cable 23. Thus the choice of a coaxial cable 23 having a high value of characteristic imperance is advantageous for the limiting of the amplitude of the input pulses by the amplifier tube 22 to provide output pulses at the terminal 31 having a uniform amplitude.

From the foregoing it will be seen that the occurrence of a pulse at the anode of the photomultiplier tube 13 results in a flow of current through the resistor 21 so that a negative bias is applied to the control grid of the tube 22 and at the same time a voltage wave is transmitted along the coaxial cable 23. Simultaneously with the above, the interelectrode and distributed capacitances of the circuit elements become charged. As the voltage wave of the coaxial cable 23 reaches the receiving end thereof, a portion of such voltage wave, as determined by the value of the resistor 24, is reflected so that such reflected voltage wave upon reaching the sending end of the cable discharges the interelectrode and distributed capacitances. Thus the voltage pulse at the control grid of the tube 22 has a duration equal to the time for the pulse to travel the length of the coaxial cable and be reflected back. Because of the sharp cut-off characteristic of the tube 22 the normal current flow is sharply cut-off by the negative grid bias so that a positive square wave is formed at the anode and coupled to the output terminal 31.

It has been found that by using a stilbene phosphor crystal 11, a type 1P21 photomultiplier tube 13, a load resistor 21 having a value of 1000 ohms, 1½ inch length of type RG65/U coaxial cable 23, a terminating resistor 24 having a value of 330 ohms, and a type 6AH6 vacuum tube 22, the resolving time of the circuit is about $10^{-8}$ second. Such short resolving time is better than that attainable with circuits known prior to the present invention and means that the circuit will accept pulses $10^{-8}$ second after the occurrence of a preceding pulse.

The present invention is useful in counting circuits as a detector and limiter to be used ahead of conventional amplifier circuits, such as distributed amplifiers and coincidence circuits, which have suitable resolving times.

While the salient features of the present invention have been described in detail with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In a pulse limiter and shaper circuit for a photomultiplier tube circuit, the combination comprising a photomultiplier tube, means connected to the elements of said tube for impressing operating voltages, a length of coaxial cable with one end of the central conductor connected to the anode of said tube, the other end of the central conductor of said cable connected to a resistive impedance having a value such that voltage reflection occurs therefrom, and limiting means connected between the anode of said tube and an output terminal for limiting the amplitude of output pulses.

2. In a pulse limiter and shaper circuit for a photomultiplier tube circuit, the combination comprising a photomultiplier tube, means connected to the elements of said photomultiplier tube for impressing operating voltages, a load resistor connected to the anode of said photomultiplier tube, a length of coaxial cable with the central conductor connected at one end to said load resistor, a terminating resistor connected to the other end of the central conductor of said cable to cause voltage reflection, and an amplitude limiting circuit connected to said load resistor and to an output terminal whereby pulses developed by said photomultiplier tube are limited in duration and amplitude at the output of said amplitude limiting circuit.

3. In a pulse limiter and shaper circuit for a photomultiplier tube circuit, the combination comprising a photomultiplier tube, means connected to the elements of said photomultiplier tube for impressing operating voltages, a load resistor connected to the anode of said photomultiplier tube, a length of coaxial cable with the central conductor connected at one end to said load resistor, said load resistor having a value substantially equal to the characteristic impedance of said cable, a terminating resistor connected to the other end of the central conductor of said cable and having a value less than the characteristic impedance thereof, and an amplitude limiting circuit connected to said load resistor.

4. In a pulse limiter and shaper circuit for a photomultiplier tube circuit, the combination comprising a photomultiplier tube, means connected to the elements of said photomultiplier tube for impressing operating voltages, a load resistor connected to the anode of said photomultiplier tube, a length of coaxial cable with the central conductor connected at one end to said load resistor, a terminating resistor connected to the other end of the central conductor of said cable to cause voltage reflection, an amplifier tube having the control grid and cathode respectively connected to the sides of said load resistor, means connected to said amplifier tube impressing operating voltages to render such tube normally conductive, and means for coupling the anode to cathode voltage of said amplifier tube to an output.

5. In a pulse limiter and shaper circuit for a photomultiplier tube circuit, the combination comprising a photomultiplier tube, means connected to the elements of said photomultiplier tube for impressing operating voltages, a load resistor connected to the anode of said photomultiplier tube, a length of coaxial cable with the central conductor connected at one end to said load resistor, the value of said load resistor being substantially equal to the characteristic impedance of said cable, a terminating resistor connected to the other end of the central conductor of said cable and having a value less than the characteristic impedance thereof and to reflect a portion of the voltage so as to cancel the voltage across said load resistor, an amplifier tube having the control grid and cathode respectively connected to either side of said load resistor, said amplifier tube having a sharp cut-off characteristic, and means connected to said amplifier tube for impressing operating voltages to render the tube normally conductive, whereby pulses of limited duration and amplitude are uniformly developed at the anode of said amplifier tube in response to pulses developed across said load resistor.

6. The combination of claim 4 wherein the length of said coaxial cable is selected so that twice the time constant thereof determines the duration of the output pulses.

References Cited in the file of this patent

UNITED STATES PATENTS

| | | |
|---|---|---|
| 1,939,435 | Cockrell | Dec. 12, 1933 |
| 2,576,661 | Wouters | Nov. 27, 1951 |
| 2,610,303 | Bell | Sept. 9, 1952 |
| 2,647,436 | Shapiro | Aug. 4, 1953 |